Dec. 11, 1928.

H. W. GOODALL ET AL 1,694,538

HOSE CLAMP

Filed June 26, 1928

INVENTORS
Howard W. Goodall
Joseph W. Walsh
BY
Augustus B. Stoughton
ATTORNEY.

WITNESS:

Dec. 11, 1928.

H. W. GOODALL ET AL

HOSE CLAMP

Filed June 26, 1928

INVENTORS
Howard W. Goodall
Joseph W. Walsh
BY
Augustus B. Stoughton
ATTORNEY.

WITNESS:

Patented Dec. 11, 1928.

1,694,538

UNITED STATES PATENT OFFICE.

HOWARD W. GOODALL, OF ALDAN, AND JOSEPH W. WALSH, OF PHILADELPHIA, PENNSYLVANIA.

HOSE CLAMP.

Application filed June 26, 1928. Serial No. 288,325.

The principal objects of the present invention are to provide a clamp adapted to oppose leakage and effect a tight joint between a hose and its internal spud in substantially all working positions assumed by the clamp; to provide a clamp that will operate efficiently throughout a considerable range of variation in diameter of the hose; to improve the application of the clamping pressure or bolt tension to the clamp, and to accomplish the foregoing objects without unduly lengthening the clamp.

Generally stated, the invention is embodied in a clamp having its tongues and the slots which receive them staggered or arranged out of line longitudinally and having its bolt lugs staggered or arranged out of line circumferentially.

The invention also comprises the improvements to be presently described and finally claimed.

In the following description reference will be made to the accompanying drawings forming part hereof and in which Figure 1 is a side view with parts in section of a section of a clamp embodying features of the invention with the other sections omitted since they are duplicates.

Figures 2, 3:
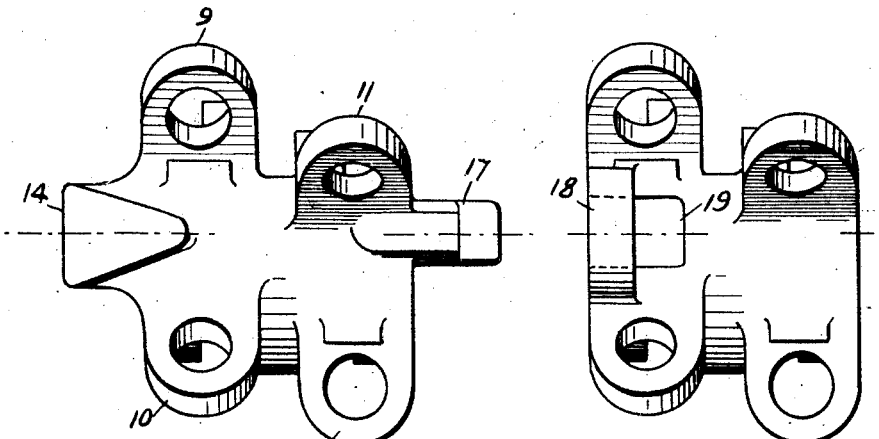
Fig. 2 is a top or plan view of the front section of a clamp.
Fig. 3 is a similar view of the rear section of a clamp.
Figure 4:
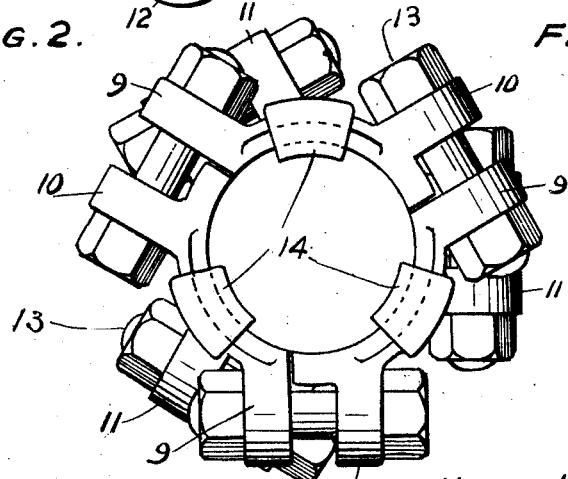
Fig. 4 is an end view looking from left to right in Fig. 1 and showing an assembly of sections constituting a clamp.

Except as will be hereinafter noted, the sections of the clamp are duplicates so that a description of one will be given and in this connection it may be said that as shown there are three sections in the clamp but the number of sections in the clamp is not in all cases material or important. A section is of the general form of a segment of the wall of a hollow cylinder and referring to Fig. 8 there is on one longitudinal edge spaced tongues 1 and 2 of which the roots 3 and 4 and the ends lie at different distances from the center line $a$—$a$ of the segment. At the other longitudinal edge there are grooves 5 and 6 of which the bottoms 7 and 8, as well as the top bounding walls, lie at different distances from the center line $a$—$a$ of the section. There are also outwardly extending bolt lugs arranged in pairs 9 and 10 in one transverse plane and 11 and 12 in another transverse plane, Fig. 2. The lugs are disposed at the roots of the tongues and to one side thereof and at the bottom of the slots and to one side thereof and they are therefore staggered circumferentially as is shown in Figs. 2, 3, and 4. 13 are bolts engaging adjacent lugs.

Figure 1:
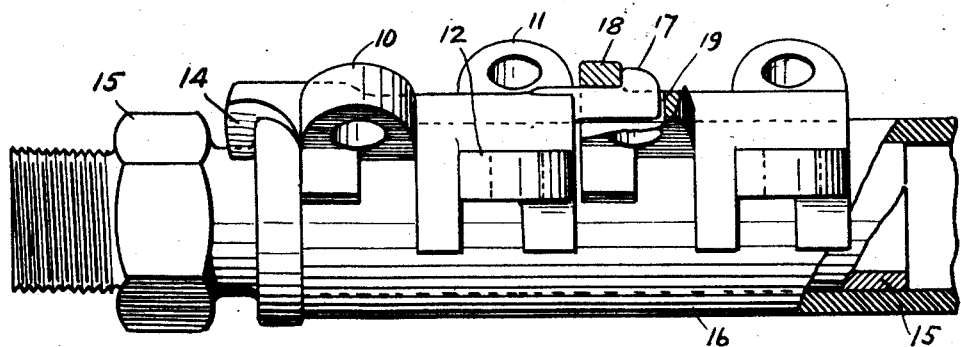
Figure 5:
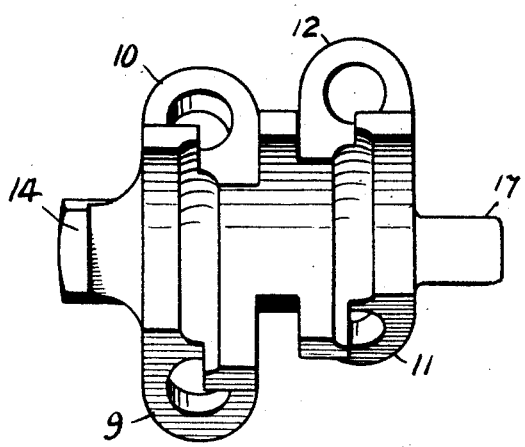
Fig. 5 is an inverted plan view of Fig. 2.
Figure 6:
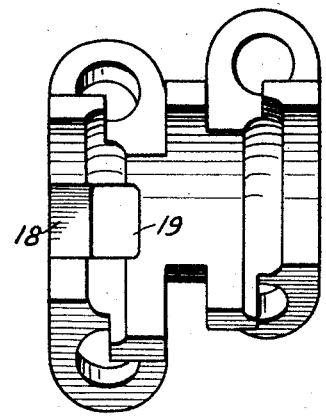
Fig. 6 is an inverted plan view of Fig. 3.
Figures 7, 8:
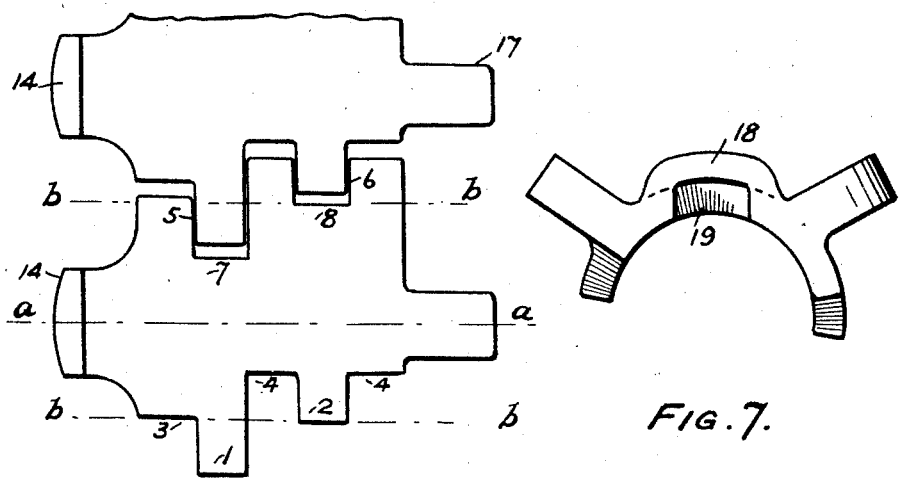
Fig. 7 is an end view of the lefthand end of the clamp shown in Fig. 6.
Fig. 8 is an inverted flattened plan view or development of a pair of clamps.

What may be called the front sections, Fig. 5, are provided with inturned feet 14, Fig. 1, each engaging a collar on the spud 15 which spud is arranged inside of the hose 16. The front clamp is also provided with an upturned hook 17 which engages a bridge 18 on the rear clamp, Figs. 3 and 7, there being a notch 19 in the rear clamp for the accommodation of the shank of the hook 17. Another way to describe the lapping relation of the tongues and grooves is to consider that the lines $b$—$b$, Fig 8, are the elements of the cylinder upon which the segment was cut so that one of the tongues 1 lies beyond and the other inside of the line $b$—$b$. Similarly one of the notches or grooves 6 lies beyond and the other of the notches or grooves lies within the line $b$—$b$.

Reference to Fig. 8 shows that the joints between the clamps lie upon broken lines, and by broken lines is meant that the lines are not straight but proceed axially and then circumferentially and then axially again. The parts of the broken line which are substantially parallel with the axis $a$—$a$ lie at different distances from it. The lines which have been referred to as broken lines may be described as being quite long. It is at those lines that leakage between the inner faces of the hose and the outer surface of the spud 15 tends to occur, and since these lines are of the character indicated, leakage is opposed to the extent of being substantially obviated. The described location of the bolt lugs in respect to the tongues, i. e. at the roots thereof and in circumferentially disposed staggered relation permits the clamp to be comparatively short. The bolt lugs that lie in one transverse plane are not opposite or in line with the bolt lugs in another transverse plane and that is what is meant by saying that the bolt lugs are disposed in staggered relation. Again the circumferentially staggered relation of the bolt lugs results in the application of bolt tension at a number of points around the circumference, additionally securing tightness of the clamp.

It will be obvious to those skilled in the art to which the invention relates that modifications may be made in details of construction and arrangement and matters of mere form without departing from the spirit of the invention which is not limited to such matters or otherwise than the prior art and the appended claims may require.

We claim:

1. A hose clamp including sections circularly arranged and each in the general form of a segment of the wall of a hollow cylinder and each having on one edge tongues and grooves, the ends of some of the tongues and the bottoms of some of the grooves being at different distances from the center line and having on the other edge similar tongues and grooves, the tongues on one edge being opposite the grooves on the other edge whereby tongues match up with grooves in the assemblage, each segment having outwardly extending bolt lugs arranged in parallel transverse planes and the lugs in one plane being staggered in respect to the lugs in another plane, the lugs being disposed at the roots of the tongues and at the bottoms of the grooves and to one side thereof, and bolts engaging the confronting lugs of adjacent sections.

2. A hose clamp including duplicate sections circularly arranged and each of the form of a segment of a hollow cylinder and having at one longitudinal edge tongues of which some project beyond the element on which the segment was cut and of which some terminate at that element and having grooves between the tongues and of which some extend beyond said element and of which some extend to said element and having on the other longitudinal edge tongues respectively extending to and projecting beyond the element on which the segment was cut and having grooves terminating short of said element, the tongues on one edge being opposite the grooves on the other edge whereby tongues and grooves match up in the assemblage, bolt lugs arranged in parallel planes and the lugs in one plane being circumferentially staggered in respect to the lugs in the other plane, and bolts engaging the confronting lugs of the respective sections.

3. A sectional hose clamp provided with tongues and with slots which receive the tongues in staggered relation longitudinally and provided with bolt lugs arranged in transverse planes with the lugs in one plane staggered circumferentially in respect to the lugs in the other plane, and bolts engaging the confronting lugs.

4. A hose clamp including a front portion and a rear portion each of said portions having tongues and grooves staggered longitudinally and having bolt lugs arranged in transverse planes and staggered circumferentially, and bolts engaging confronting lugs in the same transverse plane, there being provided near the front and rear portions, hooks and slotted bridges for connecting said portions.

5. A hose clamp including circularly arranged sections each in the general form of a segment of the wall of a hollow cylinder and each section having on both edges tongues and grooves separating the tongues, the tongues and grooves of each section matching with the tongues and grooves on the succeeding section, the ends of respective tongues and the bottom walls of respective grooves lying at different distances from the center line of the section on which they are provided, each of said sections having bolt lugs arranged in circumferentially staggered relation, and bolts connecting the confronting lugs of the succeeding sections.

HOWARD W. GOODALL.
JOSEPH W. WALSH.